(12) United States Patent
Tamrakar et al.

(10) Patent No.: US 10,938,458 B2
(45) Date of Patent: Mar. 2, 2021

(54) METHOD FOR INDICATING PRECODING INFORMATION, USER EQUIPMENT, AND ACCESS NETWORK ENTITY

(71) Applicant: CHINA ACADEMY OF TELECOMMUNICATIONS TECHNOLOGY, Beijing (CN)

(72) Inventors: Rakesh Tamrakar, Beijing (CN); Qiubin Gao, Beijing (CN); Hui Li, Beijing (CN); Runhua Chen, Beijing (CN); Chuanjun Li, Beijing (CN); Mengjun Wang, Beijing (CN); Xin Su, Beijing (CN); Qiuping Huang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 2 days.

(21) Appl. No.: 16/461,087

(22) PCT Filed: Nov. 10, 2017

(86) PCT No.: PCT/CN2017/110468
§ 371 (c)(1),
(2) Date: May 15, 2019

(87) PCT Pub. No.: WO2018/090876
PCT Pub. Date: May 24, 2018

(65) Prior Publication Data
US 2020/0036417 A1    Jan. 30, 2020

(30) Foreign Application Priority Data
Nov. 15, 2016 (CN) .......................... 201611030036.X (51) Int. Cl.
*H04B 7/0456* (2017.01)
*H04B 7/06* (2006.01)
*H04L 5/00* (2006.01)

(52) U.S. Cl.
CPC ......... *H04B 7/0478* (2013.01); *H04B 7/0639* (2013.01); *H04L 5/0082* (2013.01)

(58) Field of Classification Search
CPC .................................................. H04B 7/0478
(Continued)

(56) References Cited

U.S. PATENT DOCUMENTS

2011/0194638 A1* 8/2011 Erell .................... H04B 7/0634
375/267
2011/0216846 A1  9/2011 Lee et al.
(Continued)

FOREIGN PATENT DOCUMENTS

CN  101272364 A  9/2008
CN  101789848 A  7/2010
(Continued)

OTHER PUBLICATIONS

PCT Written Opinion of the International Searching Authority dated Jan. 25, 2018 for International Application No. PCT/CN2017/110468 (with English translation).
(Continued)

*Primary Examiner* — Peter G Solinsky
(74) *Attorney, Agent, or Firm* — Harness, Dickey and Pierce, P.L.C.

(57) ABSTRACT

A method for indicating precoding information, user equipment (UE) and an access network entity are provided according to the disclosure. The method includes: receiving, by a user equipment (UE), a control signaling transmitted by an access network entity; determining, by the UE, a multilevel codebook index in response to the control signaling;
(Continued)

transmitting, by an access network entity, a control signaling to UE, where the control signaling is used for the UE to determine a multilevel codebook index and the multilevel codebook index is used for the UE to determine a target precoding matrix / 601 and determining, by the UE, a target precoding matrix based on the multilevel codebook index and a multilevel codebook obtained in advance.

18 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2015/0358066 A1 | 12/2015 | Liu et al. | |
| 2016/0072562 A1* | 3/2016 | Onggosanusi | H04B 7/0478 370/329 |
| 2016/0248492 A1* | 8/2016 | Prasad | H04B 7/065 |
| 2016/0353424 A1* | 12/2016 | Stirling-Gallacher | H04B 7/0626 |
| 2018/0048364 A1* | 2/2018 | Girnyk | H04B 7/0456 |
| 2018/0198511 A1* | 7/2018 | Maamari | H04B 7/063 |

FOREIGN PATENT DOCUMENTS

| | | |
|---|---|---|
| CN | 102082593 A | 6/2011 |
| CN | 102158315 A | 8/2011 |
| CN | 103944621 A | 7/2014 |
| WO | WO-2013068916 A1 | 5/2013 |

OTHER PUBLICATIONS

Partial Supplemental European Search Report dated Jul. 25, 2019 for EPO Application No. 17870985.3.
"Discussion on UL-MIMO schemes for NR", NPL-3-3GPP TSG RAN WG1 Meeting #87, R1-1611802, Reno, USA, Nov. 14-18, 2016.
"Discussion on UL MIMO transmission", NPL-4-3GPP TSG RAN WG1 Meeting #87, R1611235, Reno, USA, Nov. 14-18, 2016.
Extended European Search Report dated Oct. 18, 2019 for European Patent Application No. 17870985.3.
"Multi-granularity codebooks for 4Tx DL MIMO", 3GPP TSG RAN WG1 Meeting #61 Bis, R1-103480, Source: CATT, Agenda Item: 6.3.4, Dresden, Germany, Jun. 28-Jul. 2, 2010.
"4-Tx codebook design for downlink MIMO enhancement", 3GPP TSG RAN WG1 Meeting #72, R1-131114, Source: New Postcom, Agenda Item: 7.2.2.1, Chicago, Illinois, USA, Apr. 15-19, 2013.
Chinese Office Action dated Dec. 31, 2019 for Chinese Patent Application No. 201611030036.X.

* cited by examiner

Fig. 5 transmitting, by an access network entity, a control signaling to UE, where the control signaling is used for the UE to determine a multilevel codebook index and the multilevel codebook index is used for the UE to determine a target precoding matrix — 601

METHOD FOR INDICATING PRECODING INFORMATION, USER EQUIPMENT, AND ACCESS NETWORK ENTITY

CROSS-REFERENCE TO RELATED APPLICATION

This application is the U.S. national phase of PCT Application No. PCT/CN2017/110468 filed on Nov. 10, 2017, which claims a priority to Chinese Patent Application No. 201611030036.X filed on Nov. 15, 2016, the disclosures of which are incorporated in their entirety by reference herein.

TECHNICAL FIELD

The present disclosure relates to the technical field of communications, in particular to a method for indicating precoding information, user equipment (UE) and an access network entity.

BACKGROUND

User equipment in an LTE (Long Term Evolution) system supports at most four antennas, a codebook for two antenna ports and a codebook for four antenna ports are defined for uplink precoding transmission in LTE, and a codebook has a few codewords due to the small number of antenna ports. In scheduling uplink data, a base station indicates, in a control signaling, for example, in DCI (Downlink Control Information), which codeword in the codebook the user equipment should use. As shown in table 1, an access network entity may indicate, with three bits in a signaling, which codeword in the codebook for two antenna ports the user equipment should use.

TABLE 1 codebook indication for two antenna ports

| Single stream | | Dual stream | |
| --- | --- | --- | --- |
| Bit field mapped to index | Message | Bit field mapped to index | Message |
| 0 | One layer: TPMI = 0 | 0 | Two layers: TPMI = 0 |
| 1 | One layer: TPMI = 1 | 1-7 | Reserved |
| 2 | One layer: TPMI = 2 | | |
| … | … | | |
| 5 | One layer: TPMI = 5 | | |
| 6-7 | Reserved | | |

To realize uplink in high-frequency bands in a next generation communications system, user equipment may be provided with plenty of antennas, and data for uplink transmission of the user equipment needs to be precoded. In this way, the size of a precoding codebook becomes very big as the user equipment has more transmitting antennas, and a precoding index will occupy more bits. Accordingly, as the number of antennas grows, more bits in the control signaling will be used to transmit the precoding index, thereby increasing signaling overheads.

SUMMARY

The present disclosure is to provide a method for indicating precoding information, user equipment (UE) and an access network entity, to address the issue of increased signaling overheads due to the fact that more bits in a control signaling will be used to transmit precoding indexes as the number of antennas grows.

To achieve the above objective, a method for indicating precoding information is provided according to an embodiment of the present disclosure. The method includes:

receiving, by user equipment (UE), a control signaling transmitted by an access network entity;

determining, by the UE, a multilevel codebook index in response to the control signaling; and determining, by the UE, a target precoding matrix based on the multilevel codebook index and a multilevel codebook obtained in advance.

Optionally, the receiving, by UE, a control signaling transmitted by an access network entity includes: receiving, by the UE, a multilevel control signaling transmitted by the access network entity, where codebook indexes of different levels are carried in different levels of the multilevel control signaling.

Optionally, the receiving, by UE, a control signaling transmitted by an access network entity includes: receiving, by the UE, multiple control signalings transmitted by the access network entity, where codebook indexes of different levels are carried in different control signalings.

Optionally, the receiving, by UE, a control signaling transmitted by an access network entity includes: receiving, by the UE, one or more control signalings transmitted by the access network entity, where a partial-level codebook index in the multilevel codebook index is carried in the one or more control signalings. The determining, by the UE, a multilevel codebook index in response to the control signaling includes: determining, by the UE, the multilevel codebook index based on the partial-level codebook index and a codebook index of another level or codebook indexes of other levels previously received.

Optionally, the multilevel codebook includes multiple precoding matrices, where a codebook index of each level corresponds to one of the precoding matrices; and the determining, by the UE, a target precoding matrix based on the multilevel codebook index and a multilevel codebook obtained in advance includes:

obtaining, by the UE, from the multilevel codebook a precoding matrix corresponding to the codebook index of each level based on the multilevel codebook index, and obtaining, by the UE, the target precoding matrix by performing a predetermined matrix operation on precoding matrices corresponding to the codebook indexes of both or all levels.

Optionally, the multilevel codebook index is a dual-level codebook index, where the dual-level codebook index includes a first-level codebook index and a second-level codebook index; and the determining, by the UE, a target precoding matrix based on the multilevel codebook index and a multilevel codebook obtained in advance includes:

obtaining, by the UE, from the multilevel codebook a first-level precoding matrix corresponding to the first-level codebook index based on the first-level codebook index, obtaining, by the UE, from the multilevel codebook a second-level precoding matrix corresponding to the second-level codebook index based on the second-level codebook index, and obtaining, by the UE, the target precoding matrix by performing the predetermined matrix operation on the first-level precoding matrix and the second-level precoding matrix.

Optionally, the first-level codebook index indicates a precoding matrix of a sub-band set, and the second-level codebook index indicates a precoding matrix of a sub-band.

Optionally, the multilevel codebook includes multiple precoding matrices, where each multilevel codebook index corresponds to one of the precoding matrices; and the determining, by the UE, a target precoding matrix based on the multilevel codebook index and a multilevel codebook obtained in advance includes: obtaining, by the UE, from the multilevel codebook obtained in advance, a precoding matrix corresponding to the multilevel codebook index as the target precoding matrix based on the multilevel codebook index.

A method for indicating precoding information is further provided according to an embodiment of the present disclosure. The method includes: transmitting, by an access network entity, a control signaling to a user equipment (UE), where the control signaling is used for the UE to determine a multilevel codebook index and the multilevel codebook index is used for the UE to determine a target precoding matrix.

Optionally, the transmitting, by an access network entity, a control signaling to UE includes: transmitting, by the access network entity, a multilevel control signaling to the UE, where codebook indexes of different levels are carried in different levels of the multilevel control signaling.

Optionally, the transmitting, by an access network entity, a control signaling to UE includes: transmitting, by the access network entity, multiple control signalings to the UE, where codebook indexes of different levels are carried in different control signalings.

Optionally, the transmitting, by an access network entity, a control signaling to UE includes: transmitting, by the access network entity, one or more control signalings to the UE, where a partial-level codebook index in the multilevel codebook index is carried in the one or more control signalings, and the partial-level codebook index is used to determine the multilevel codebook index with a codebook index of another level or codebook indexes of other levels previously received.

Optionally, the multilevel codebook includes multiple precoding matrices, where a codebook index of each level corresponds to one of the precoding matrices; and the target precoding matrix is obtained by performing a predetermined operation on precoding matrices corresponding to the codebook indexes of both or all levels in the multilevel codebook index.

Optionally, the multilevel codebook includes multiple precoding matrices, where each multilevel codebook index corresponds to one of the precoding matrices; and the target precoding matrix is a precoding matrix in the multilevel codebook and corresponding to the multilevel codebook index.

User equipment (UE) is further provided according to an embodiment of the present disclosure, which includes:

a receiving module, configured to receive a control signaling transmitted by an access network entity;

a first determining module, configured to determine a multilevel codebook index in response to the control signaling; and a second determining module, configured to determine a target precoding matrix based on the multilevel codebook index and a multilevel codebook obtained in advance.

Optionally, the receiving module is configured to receive a multilevel control signaling transmitted by the access network entity, where codebook indexes of different levels are carried in different levels of the multilevel control signaling.

Optionally, the receiving module is configured to receive multiple control signalings transmitted by the access network entity, where codebook indexes of different levels are carried in different control signalings.

Optionally, the receiving module is configured to receive one or more control signalings transmitted by the access network entity, where a partial-level codebook index in the multilevel codebook index is carried in the one or more control signalings; and the first determining module is configured to determine the multilevel codebook index based on the partial-level codebook index and a codebook index of another level or codebook indexes of other levels previously received.

Optionally, the multilevel codebook includes multiple precoding matrices, where a codebook index of each level corresponds to one of the precoding matrices; and the second determining module includes:

a first determining unit, configured to obtain, from the multilevel codebook a precoding matrix corresponding to the codebook index of each level based on the multilevel codebook index, and a first computation unit, configured to obtain the target precoding matrix by performing a predetermined matrix operation on precoding matrices corresponding to codebook indexes of both or all levels.

Optionally, the multilevel codebook index is a dual-level codebook index, where the dual-level codebook index includes a first-level codebook index and a second-level codebook index; and the second determining module includes:

a second determining unit, configured to obtain, from the multilevel codebook a first-level precoding matrix corresponding to the first-level codebook index based on the first-level codebook index, a third determining unit, configured to obtain, from the multilevel codebook a second-level precoding matrix corresponding to the second-level codebook index based on the second-level codebook index, and a second computation unit, configured to obtain the target precoding matrix by performing the predetermined matrix operation on the first-level precoding matrix and the second-level precoding matrix.

Optionally, the first-level codebook index indicates a precoding matrix of a sub-band set, and the second-level codebook index indicates a precoding matrix of a sub-band.

Optionally, the multilevel codebook includes multiple precoding matrices, where each multilevel codebook index corresponds to a precoding matrix; and the second determining module is configured to obtain, from the multilevel codebook obtained in advance, a precoding matrix corresponding to the multilevel codebook index as the target precoding matrix.

An access network entity is further provided according to an embodiment of the present disclosure, which includes: a transmitting module, configured to transmit a control signaling to user equipment (UE), where the control signaling is used for the UE to determine a multilevel codebook index and the multilevel codebook index is used for the UE to determine a target precoding matrix.

Optionally, the transmitting module is configured to transmit a multilevel control signaling to the UE, where codebook indexes of different levels are carried in different levels of the multilevel control signaling.

Optionally, the transmitting module is configured to transmit multiple control signalings to the UE, where codebook indexes of different levels are carried in different control signalings.

Optionally, the transmitting module is configured to transmit one or more control signalings to the UE, where a partial-level codebook index in the multilevel codebook index is carried in the one or more control signalings, and the partial-level codebook index is used to determine the multilevel codebook index with a codebook index of another level or codebook indexes of other levels previously received.

Optionally, the multilevel codebook includes multiple precoding matrices, where a codebook index of each level corresponds to a precoding matrix; and the target precoding matrix is obtained by performing a predetermined operation on precoding matrices corresponding to codebook indexes of both or all levels in the multilevel codebook index.

Optionally, the multilevel codebook includes multiple precoding matrices, where each multilevel codebook index corresponds to a precoding matrix; and the target precoding matrix is a precoding matrix in the multilevel codebook and corresponding to the multilevel codebook index.

User equipment (UE) is further provided according to an embodiment of the present disclosure, which includes a transceiver, a processor, and a memory configured to store programs or data used for the processor to perform operations, where the transceiver is configured to receive a control signaling transmitted by an access network entity, and the processor is configured to determine a multilevel codebook index in response to the control signaling as received by the transceiver and determine a target precoding matrix based on the multilevel codebook index and a multilevel codebook obtained in advance.

An access network entity is further provided according an embodiment of the present disclosure, which includes a transceiver, a processor, and a memory configured to store programs or data used for the processor to perform operations, where the processor is configured to transmit a control signaling to user equipment (UE) by the transceiver, where the control signaling is used for the UE to determine a multilevel codebook index and the multilevel codebook index is used for the UE to determine a target precoding matrix.

A computer-readable storage medium is further provided according an embodiment of the present disclosure, where instructions for performing the following steps are stored on the computer-readable storage medium: receiving a control signaling transmitted by an access network entity, determining a multilevel codebook index in response to the control signaling, and determining a target precoding matrix based on the multilevel codebook index and a multilevel codebook obtained in advance.

A computer-readable storage medium is further provided according an embodiment of the present disclosure, where instructions for performing the following step are stored on the computer-readable storage medium: transmitting, by an access network entity, a control signaling to user equipment (UE), where the control signaling is used for the UE to determine a multilevel codebook index and the multilevel codebook index is used for the UE to determine a target precoding matrix.

The technical solutions according to the present disclosure at least have the beneficial effects as follows.

According to the embodiments of the present disclosure, the UE receives a control signaling transmitted by the access network entity, determines a multilevel codebook index in response to the control signaling and determines a target precoding matrix based on the multilevel codebook index and a multilevel codebook obtained in advance. In this way, the precoding codebook is set to be a multilevel codebook in the method for indicating precoding information according to the present disclosure, and the UE determines the target precoding matrix based on the multilevel codebook index and the multilevel codebook. The hierarchical codebook index occupies less bits, thereby saving signaling overheads and improving transmission efficiency.

BRIEF DESCRIPTION OF THE DRAWINGS

In order to more clearly describe the technical solutions of the present disclosure, the drawings involved in description of the embodiments according to the present disclosure are briefly introduced below. Apparently, the drawings introduced below only illustrate some embodiments of the present disclosure, and other drawings may be obtained by those skilled in the art based on the appended drawings without any inventive efforts.

DETAILED DESCRIPTION

In order to better clarify the technical problem to be solved, the technical solutions and the advantages of the present disclosure, the present disclosure is described hereinafter in detail in conjunction with the drawings and the embodiments.

Figure 1:
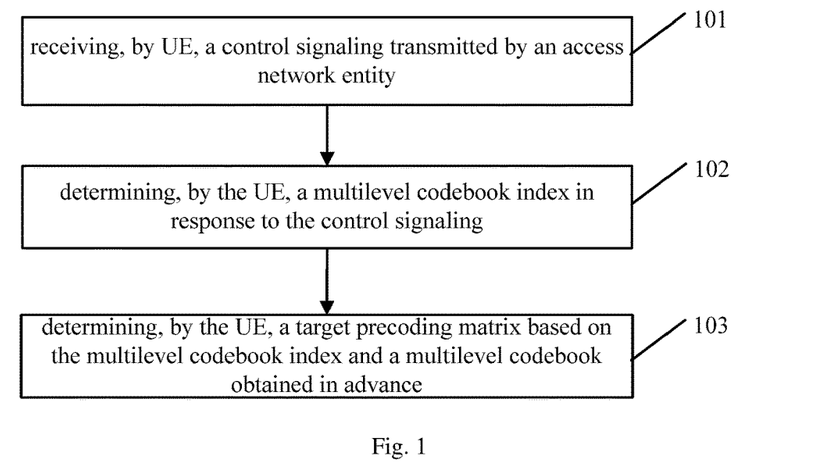
FIG. 1 is a flowchart of a method for indicating precoding information according to an embodiment of the present disclosure.

With reference to FIG. 1, FIG. 1 shows a method for indicating precoding information according to an embodiment of the present disclosure. As shown in FIG. 1, the method includes the following steps:

step 101, receiving, by UE, a control signaling transmitted by an access network entity;

step 102, determining, by the UE, a multilevel codebook index in response to the control signaling; and step 103, determining, by the UE, a target precoding matrix based on the multilevel codebook index and a multilevel codebook obtained in advance.

In the embodiment, the access network entity transmits a control signaling to the UE in scheduling uplink data, where the control signaling is used for the UE to determine a multilevel codebook index. The access network entity may transmit one control signaling to the UE, where the multilevel codebook index is carried in the one control signaling. The access network entity may encode each level of codebook index in the multilevel codebook separately and carry the all levels of codebook indexes in the one control signaling, or the access network entity may jointly encode indexes of all levels and carry the jointly encoded indexes of all levels in the one control signaling. Accordingly, the UE receives the one control signaling transmitted by the access network entity, and obtains the multilevel codebook index from the one control signaling.

Optionally, the access network entity may transmit multiple control signalings to the UE, and the multilevel codebook index is jointly carried in the multiple control signalings. Accordingly, the UE receives the multiple control signalings transmitted by the access network entity and determines the multilevel codebook index jointly in response to the multiple control signalings.

Optionally, the access network entity may transmit one or more control signalings to the UE, a codebook index of a part level in the multilevel codebook index is carried in the one or more control signalings, and the UE determines the multilevel codebook index based on the codebook index of the part level and codebook indexes of levels other than the part level that have been previously received. For example, supposing the multilevel codebook index is a dual-level codebook index, the access network entity may transmit one control signaling to the UE, where a second-level codebook index is carried in the one control signaling, the UE receives the one control signaling and obtains the second-level codebook index, a first-level codebook index previously received by the UE is determined, and the dual-level codebook index is determined based on the first-level codebook index and the second-level codebook index.

The UE determines a target precoding matrix based on the multilevel codebook index and a multilevel codebook obtained in advance. The multilevel codebook obtained in advance may be a multilevel codebook that the access network entity transmits to the UE in advance, or a multilevel codebook stored in the UE in advance.

In some embodiments of the present disclosure, the multilevel codebook includes multiple precoding matrices, where each multilevel codebook index corresponds to one of the precoding matrices. The UE obtains, from the multilevel codebook index obtained in advance, a precoding matrix corresponding to the multilevel codebook index as the target precoding matrix, and performs encoding processing on data for uplink transmission based on the precoding matrix, after determining the target precoding matrix.

In some embodiments of the present disclosure, the multilevel codebook includes multiple precoding matrices, where a codebook index of each level corresponds to one of the precoding matrices. The UE obtains, from the multilevel codebook, a precoding matrix corresponding to the codebook index of each level, and performs a predetermined matrix operation on precoding matrices corresponding to the codebook indexes of both or all levels, to obtain the target precoding matrix. The predetermined matrix operation may be matrix scalar multiplication or matrix cross multiplication, which is not limited herein. It should be noted that in some embodiments of the present disclosure, the matrix operation may not be predetermined, but is carried in the control signaling, and the UE obtains the multilevel codebook index and the matrix operation from the control signaling.

Optionally, the receiving, by UE, a control signaling transmitted by an access network entity includes: receiving, by the UE, a multilevel control signaling transmitted by the access network entity, where codebook indexes of different levels are carried in different levels of the multilevel control signaling.

In the embodiment, the access network entity transmits one control signaling to the UE, and the one control signaling is a multilevel control signaling, where codebook indexes of different levels are carried in different levels of the control signaling. Different levels of the one control signaling may refer to different bits of the control signaling, or the control signaling may be divided into levels in other manners, where one bit of the control signaling may correspond to a codebook index of one level, or it may be multiple bits that correspond to a codebook index of one level, which is not limited herein. The UE may obtain codebook indexes of different levels from predetermined bits of the multilevel control signaling, and determine the multilevel codebook index based on the codebook indexes of different levels. The embodiments of the present disclosure are described by taking two levels of codebook indexes for example.

Figure 2:
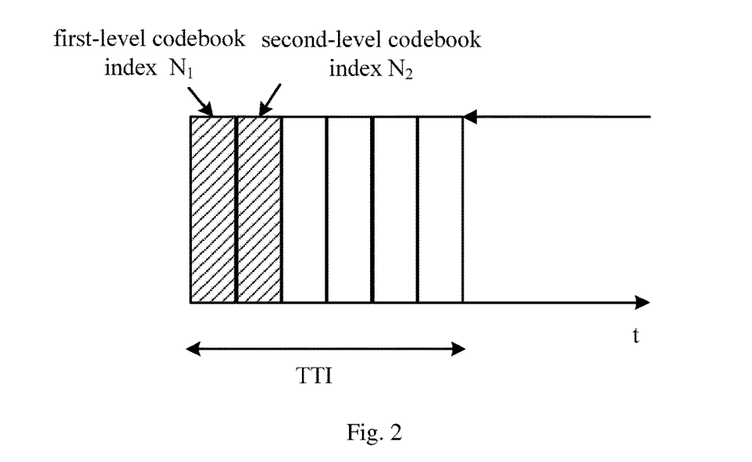
FIG. 2 is a schematic diagram of a method for indicating precoding information according to an embodiment of the present disclosure.

For example, reference is made to FIG. 2 which shows a schematic diagram of a method for indicating precoding information according to an embodiment of the present disclosure. As shown in FIG. 2, the access network entity transmits a control signaling to the UE, where a first bit (i.e., the first level) of the control signaling indicates a first-level codebook index $N_1$, a second bit (i.e., the second level) of the control signaling indicates a second-level codebook index $N_2$, and the UE determines a first-level codebook index and a second-level codebook index of the multilevel codebook index to be $N_1$ and $N_2$, respectively.

Optionally, the receiving, by UE, a control signaling transmitted by an access network entity includes: receiving, by the UE, multiple control signalings transmitted by the access network entity, where codebook indexes of different levels are carried in different control signalings.

Figure 3:
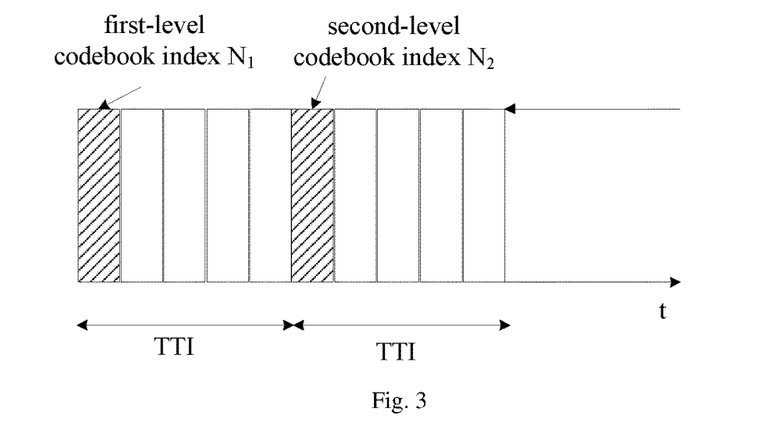
FIG. 3 is a schematic diagram of a method for indicating precoding information according to another embodiment of the present disclosure.

In the embodiment, the access network entity transmits multiple control signalings to the UE, where codebook indexes of different levels are carried in different control signalings. The access network entity may transmit the multiple control signalings to the UE at the same time or at different times. Reference is made to FIG. 3, which shows a schematic diagram of the method according to an embodiment of the present disclosure. FIG. 3 illustrates an example that the access network entity transmits control signalings to the UE at different times. As shown in FIG. 3, the access network entity transmits a control signaling carrying a first-level codebook index $N_1$ to the UE in one TTI (Transmission Time Interval), and transmits a control signaling carrying a second-level codebook index $N_2$ to the UE in another TTI, and the UE determines the target precoding matrix based on the first-level codebook index $N_1$ and the second-level codebook index $N_2$.

Optionally, the receiving, by UE, a control signaling transmitted by an access network entity includes: receiving, by the UE, one or more control signalings transmitted by the access network entity, where a partial-level codebook index in the multilevel codebook index is carried in the one or more control signalings. The determining, by the UE, a multilevel codebook index in response to the control signaling includes: determining, by the UE, the multilevel codebook index based on the partial-level codebook index and a codebook index of another level or codebook indexes of other levels previously received.

Figure 4:
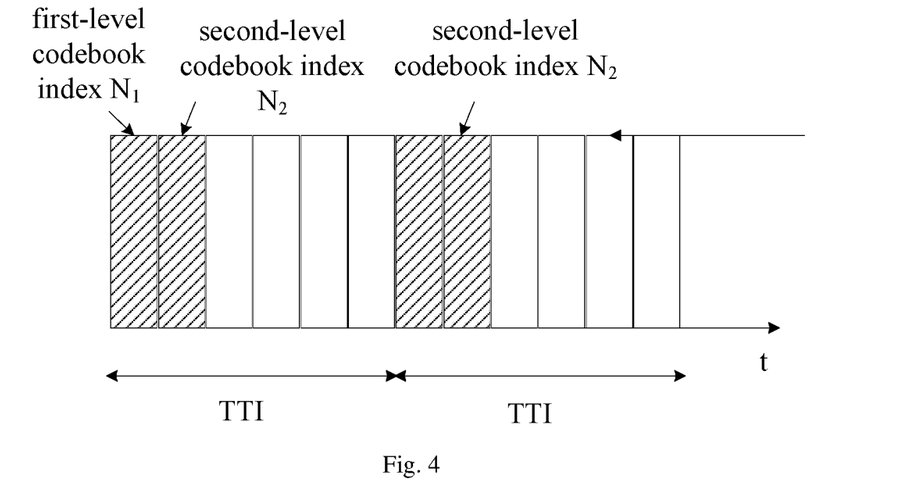
FIG. 4 is a schematic diagram of a method for indicating precoding information according to an embodiment of the present disclosure.
Figure 5:
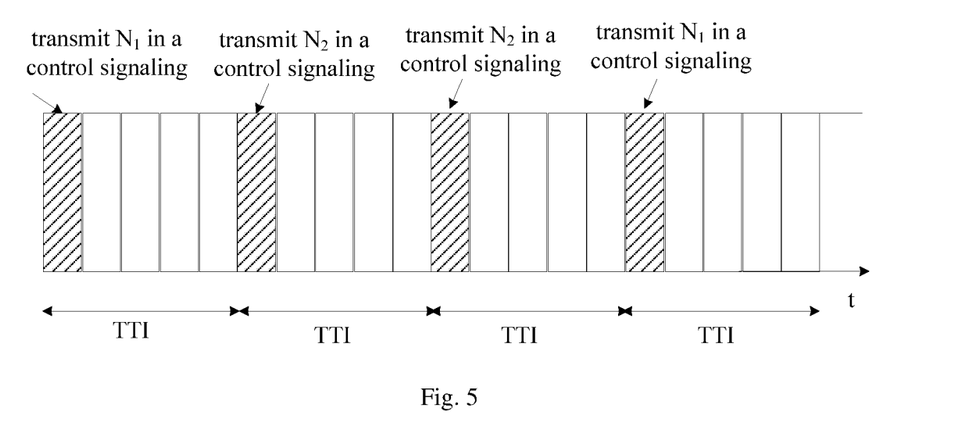
FIG. 5 is a schematic diagram of a method for indicating precoding information according to an embodiment of the present disclosure.

In the embodiment, the access network entity transmits partial-level codebook indexes of the multilevel codebook index to the UE in different TTIs, and the UE determines the multilevel codebook index based on a partial-level codebook index and a codebook index of another level or codebook indexes of other levels previously received. Reference is made to FIG. 4, which shows a schematic diagram according to an embodiment of the present disclosure. As shown in FIG. 4, the access network entity transmits a control signaling carrying a second-level codebook index $N_2$ to the UE in a second TTI, the UE receives the control signaling and obtains the second-level codebook index $N_2$, and the UE determines the target precoding matrix based on the second-level codebook index $N_2$ and a first-level codebook index $N_1$ received in a first TTI. As another example, with reference to the schematic diagram shown in FIG. 5, in a case that the UE receives, in a third TTI, a second-level codebook index $N_2$ transmitted by the access network entity, the UE determines the multilevel codebook index based on the $N_2$ as received and the first-level codebook index $N_1$ received in the first TTI. Similarly, in a case that the UE receives, in a fourth TTI, a first-level codebook index $N_1$ transmitted by the access network entity, the UE determines the multilevel codebook index based on the $N_1$ as received and the second-level codebook index $N_2$ received in the third TTI. That is, the UE determines the multilevel codebook index bases on the partial-level codebook index received this time and a codebook index of another level recently received.

Optionally, the multilevel codebook includes multiple precoding matrices, where a codebook index of each level corresponds to one of the precoding matrices; and the determining, by the UE, a target precoding matrix based on the multilevel codebook index and a multilevel codebook obtained in advance includes:

obtaining, by the UE, from the multilevel codebook, a precoding matrix corresponding to the codebook index of each level based on the multilevel codebook index, and obtaining, by the UE, the target precoding matrix by performing a predetermined matrix operation on precoding matrices corresponding to the codebook indexes of both or all levels.

In the embodiment, the multilevel codebook index includes multiple precoding matrices, and a codebook of each level corresponds to one of the precoding matrices. The UE obtains, from the multilevel codebook, a precoding matrix corresponding to the codebook index of each level based on the multilevel codebook index, and performs a predetermined matrix operation on precoding matrices corresponding to the codebook indexes of both or all levels to obtain the target precoding matrix. For example, supposing the first-level codebook index corresponds to a matrix $W_1$ and the second-level codebook index corresponds to a matrix $W_2$, the UE determines the target precoding matrix to be $W=W_1 \cdot W_2$ or $W=W_1 \otimes W_2$.

Optionally, the multilevel codebook index is a dual-level codebook index, where the dual-level codebook index includes a first-level codebook index and a second-level codebook index; and the determining, by the UE, a target precoding matrix based on the multilevel codebook index and a multilevel codebook obtained in advance includes:

obtaining, by the UE, from the multilevel codebook, a first-level precoding matrix corresponding to the first-level codebook index based on the first-level codebook index, obtaining, by the UE, from the multilevel codebook, a second-level precoding matrix corresponding to the second-level codebook index based on the second-level codebook index, and obtaining, by the UE, the target precoding matrix by performing the predetermined matrix operation on the first-level precoding matrix and the second-level precoding matrix.

In the embodiment, the multilevel codebook index is a dual-level codebook index which includes a first-level codebook index and a second-level codebook index. The UE obtains, from the multilevel codebook, a first-level precoding matrix corresponding to the first-level codebook index based on the first-level codebook index, obtains, from the multilevel codebook, a second-level precoding matrix corresponding to the second-level codebook index based on the second-level codebook index, and performs a predetermined matrix operation on the first-level precoding matrix and the second-level precoding matrix to obtain the target precoding matrix.

Optionally, the first-level codebook index indicates a precoding matrix of a sub-band set, and the second-level codebook index indicates a precoding matrix of a sub-band.

For example, supposing uplink resources scheduled for the UE include one sub-band set, the one sub-band set includes two sub-bands (for example, a first sub-band and a second sub-band), a first-level codebook index indicates a precoding matrix $W_1$ of the one sub-band set, and second-level codebook indexes $N_{2,1}$ and $N_{2,2}$ respectively indicate precoding matrices $W_{2,1}$ and $W_{2,2}$ of the two sub-bands. The UE may determine a target precoding matrix to be $W_1 \otimes W_{2,1}$ based on $N_1$ and $N_{2,1}$, or determine a target precoding matrix to be $W_1 \otimes W_{2,2}$ based on $N_1$ and $N_{2,2}$.

Supposing uplink resources scheduled for the UE include two sub-band sets (for example, a first sub-band set and a second sub-band set), the first sub-band set includes two sub-bands (for example, a first sub-band and a second sub-band), and the second sub-band set includes two sub-bands (for example, a third sub-band and a fourth sub-band). First-level precoding matrices $W_{1,1}$, $W_{1,2}$ respectively correspond to the first sub-band set and the second sub-band set, and second-level precoding matrices $W_{2,1}$, $W_{2,2}$, $W_{2,3}$ and $W_{2,4}$ respectively correspond to the first, the second, the third and the fourth sub-bands. The UE may determine a target precoding matrix of the first sub-band to be $W_{1,1} \otimes W_{2,1}$, a target precoding matrix of the second sub-band to be $W_{1,1} \otimes W_{2,2}$, a target precoding matrix of the third sub-band to be $W_{1,2} \otimes W_{2,3}$ and a target precoding matrix of the fourth sub-band to be $W_{1,2} \otimes W_{2,4}$.

Optionally, the multilevel codebook includes multiple precoding matrices, where each multilevel codebook index corresponds to a precoding matrix; and the determining, by the UE, a target precoding matrix based on the multilevel codebook index and a multilevel codebook obtained in advance includes: obtaining, by the UE, from the multilevel codebook obtained in advance, a precoding matrix corresponding to the multilevel codebook index as the target precoding matrix based on the multilevel codebook index.

In the embodiment, the multilevel codebook is a multi-dimensional table including multiple precoding matrices. Taking a dual-level codebook for example, the dual-level codebook may be two-dimensional table including multiple precoding matrices, a first-level codebook index and a second-level codebook index are used to jointly determine a corresponding precoding matrix in the dual-level codebook as the target precoding matrix. For example, the two-dimensional table may be equivalent to a two-dimensional coordinate system. The first-level codebook index may be equivalent to a horizontal (vertical) coordinate, the second-level codebook index may be equivalent to a vertical (horizontal) coordinate, and the UE determines a precoding matrix at a coordinate point corresponding to the horizontal coordinate and the vertical coordinate in the two-dimensional coordinate system, to be the target precoding matrix.

The UE according to the present disclosure may be alternatively referred to as a terminal, which may be a cellphone, a computer, a household appliance, a table personal computer (Tablet Personal Computer), a laptop computer (Laptop Computer), a personal digital assistant (personal digital assistant, abbreviated as PDA), a mobile internet device (Mobile Internet Device, abbreviated as MID) or a wearable device (Wearable Device). It should be noted that the type of the UE is not limited in the embodiment of the present disclosure.

In the embodiments of the present disclosure, the UE receives a control signaling transmitted by an access network entity, determines a multilevel codebook index in response to the control signaling, and determines a target precoding matrix based on the multilevel codebook index and a multilevel codebook obtained in advance. In this way, the precoding codebook is set to be a multilevel codebook in the method for indicating precoding information according to the present disclosure, and the UE determines the target precoding matrix based on the multilevel codebook index and the multilevel codebook. The hierarchical codebook indexes occupy less bits, thereby saving signaling overheads and improving transmission efficiency.

Figure 6:
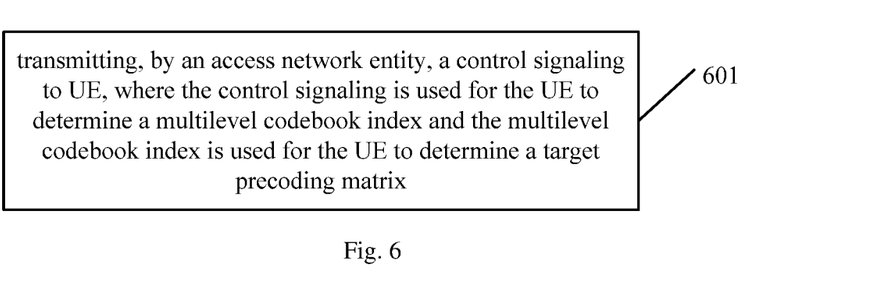
FIG. 6 is a flowchart of a method for indicating precoding information according to an embodiment of the present disclosure.

Reference is made to FIG. 6, which shows a flowchart of a method for indicating precoding information according to an embodiment of the present disclosure. As shown in FIG. 6, the method includes the following step:

step 601, transmitting, by an access network entity, a control signaling to UE, where the control signaling is used for the UE to determine a multilevel codebook index and the multilevel codebook index is used for the UE to determine a target precoding matrix.

Optionally, the transmitting, by an access network entity, a control signaling to UE includes: transmitting, by the access network entity, a multilevel control signaling to the UE, where codebook indexes of different levels are carried in different levels of the multilevel control signaling.

Optionally, the transmitting, by an access network entity, a control signaling to UE includes: transmitting, by the access network entity, multiple control signalings to the UE, where codebook indexes of different levels are carried in different control signalings.

Optionally, the transmitting, by an access network entity, a control signaling to UE includes: transmitting, by the access network entity, one or more control signalings to the UE, where a partial-level codebook index in the multilevel codebook index is carried in the one or more control signalings, and the partial-level codebook index is used to determine the multilevel codebook index with a codebook index of another level or codebook indexes of other levels previously received.

Optionally, the multilevel codebook includes multiple precoding matrices, where a codebook index of each level corresponds to a precoding matrix; and the target precoding matrix is obtained by performing a predetermined operation on precoding matrices corresponding to codebook indexes of both or all levels in the multilevel codebook index.

Optionally, the multilevel codebook includes multiple precoding matrices, where each multilevel codebook index corresponds to a precoding matrix; and the target precoding matrix is a precoding matrix in the multilevel codebook and corresponding to the multilevel codebook index.

It should be noted that the embodiment may be an embodiment described from the perspective of an access network entity, which corresponds to the embodiment shown in FIG. 1, and reference can be made to the description of the embodiment shown in FIG. 1 for the related steps performed by the access network entity, which are thus not described in detail herein. The access network entity may be a base station, which is not limited herein.

Figure 7:
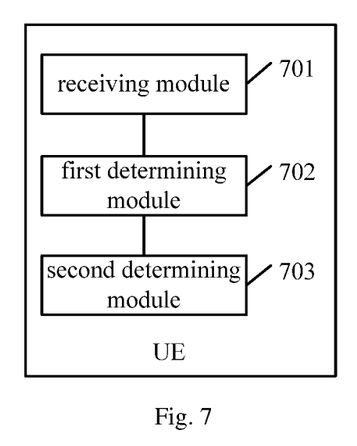
FIG. 7 is a schematic structural diagram of UE according to an embodiment of the present disclosure.

Reference is made to FIG. 7, which shows a schematic structural diagram of UE according to an embodiment of the present disclosure. As shown in FIG. 7, the UE includes:

a receiving module 701, configured to receive a control signaling transmitted by an access network entity;

a first determining module 702, configured to determine a multilevel codebook index in response to the control signaling; and a second determining module 703, configured to determine a target precoding matrix based on the multilevel codebook index and a multilevel codebook obtained in advance.

Optionally, the receiving module 701 is configured to receive a multilevel control signaling transmitted by the access network entity, where codebook indexes of different levels are carried in different levels of the multilevel control signaling.

Optionally, the receiving module 701 is configured to receive multiple control signalings transmitted by the access network entity, where codebook indexes of different levels are carried in different control signalings.

Optionally, the receiving module 701 is configured to receive one or more control signalings transmitted by the access network entity, where a partial-level codebook index in the multilevel codebook index is carried in the one or more control signalings; and the first determining module 702 is configured to determine the multilevel codebook index based on the partial-level codebook index and a codebook index of another level or codebook indexes of other levels previously received.

Optionally, the multilevel codebook includes multiple precoding matrices, where a codebook index of each level corresponds to a precoding matrix.

Figure 8:
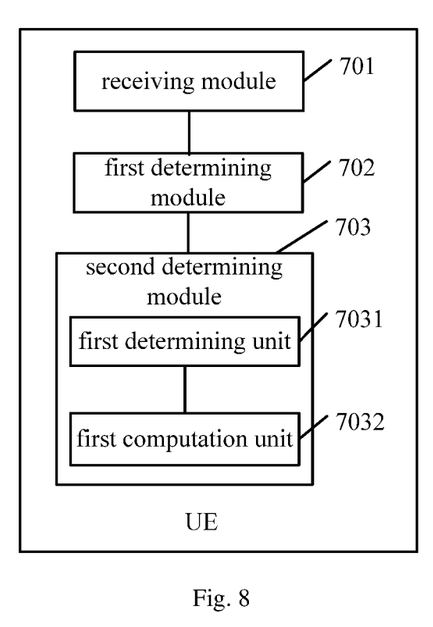
FIG. 8 is a schematic structural diagram of UE according to an embodiment of the present disclosure.

Reference is made to FIG. 8, which shows a schematic structural diagram of UE according to an embodiment of the present disclosure. As shown in FIG. 8, the second determining module 703 includes:

a first determining unit 7031, configured to obtain, from the multilevel codebook, a precoding matrix corresponding to the codebook index of each level based on the multilevel codebook index, and a first computation unit 7032, configured to obtain the target precoding matrix by performing a predetermined matrix operation on precoding matrices corresponding to codebook indexes of both or all levels.

Optionally, the multilevel codebook index is a dual-level codebook index, where the dual-level codebook index includes a first-level codebook index and a second-level codebook index.

Figure 9:
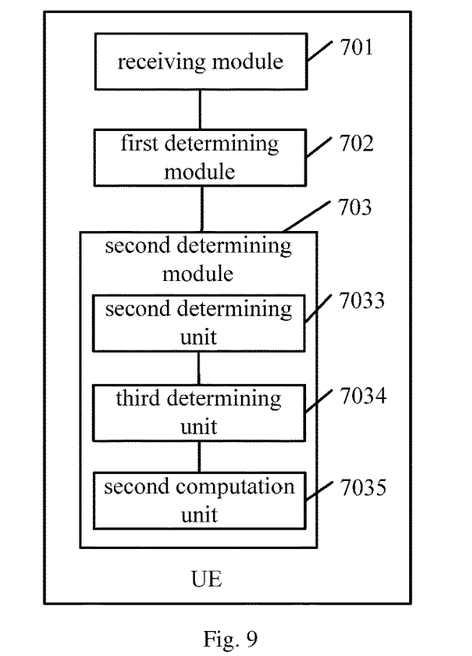
FIG. 9 is a schematic structural diagram of UE according to an embodiment of the present disclosure.

Reference is made to FIG. 9, which shows a schematic structural diagram of UE according to an embodiment of the present disclosure. As show in FIG. 9, the second determining module 703 includes:

a second determining unit 7033, configured to obtain, from the multilevel codebook, a first-level precoding matrix corresponding to the first-level codebook index based on the first-level codebook index, a third determining unit 7034, configured to obtain, from the multilevel codebook, a second-level precoding matrix corresponding to the second-level codebook index based on the second-level codebook index, and a second computation unit 7035, configured to obtain the target precoding matrix by performing the predetermined matrix operation on the first-level precoding matrix and the second-level precoding matrix.

Optionally, the first-level codebook index indicates a precoding matrix of a sub-band set, and the second-level codebook index indicates a precoding matrix of a sub-band.

Optionally, the multilevel codebook includes multiple precoding matrices, where each multilevel codebook index corresponds to a precoding matrix; and the second determining module 703 is configured to obtain, from the multilevel codebook obtained in advance, a precoding matrix corresponding to the multilevel codebook index as the target precoding matrix.

It should be noted that the UE referred to in this embodiment may be the UE according to the embodiments shown in FIGS. 1 to 6, and any implementation of the UE according to the embodiments shown in FIGS. 1 to 6 can be achieved by the UE of this embodiment with the same beneficial effects, which is thus not described in detail herein.

Figure 10:
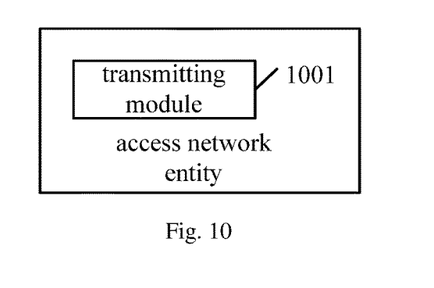
FIG. 10 is a schematic structural diagram of an access network entity according to an embodiment of the present disclosure.

Reference is made to FIG. 10, which shows a schematic structural diagram of an access network entity according to an embodiment of the present disclosure. As shown in FIG. 10, the access network entity includes: a transmitting module 1001, configured to transmit a control signaling to UE, where the control signaling is used for the UE to determine a multilevel codebook index and the multilevel codebook index is used for the UE to determine a target precoding matrix.

Optionally, the transmitting module 1001 is configured to transmit a multilevel control signaling to the UE, where codebook indexes of different levels are carried in different levels of the multilevel control signaling.

Optionally, the transmitting module 1001 is configured to transmit multiple control signalings to the UE, where codebook indexes of different levels are carried in different control signalings.

Optionally, the transmitting module 1001 is configured to transmit one or more control signalings to the UE, where a partial-level codebook index in the multilevel codebook index is carried in the one or more control signalings, and the partial-level codebook index is used to determine the multilevel codebook index with a codebook index of another level or codebook indexes of other levels previously received.

Optionally, the multilevel codebook includes multiple precoding matrices, where a codebook index of each level corresponds to a precoding matrix; and the target precoding matrix is obtained by performing a predetermined operation on precoding matrices corresponding to the codebook indexes of both or all levels in the multilevel codebook index.

Optionally, the multilevel codebook includes multiple precoding matrices, where each multilevel codebook index corresponds to a precoding matrix; and the target precoding matrix is a precoding matrix in the multilevel codebook and corresponding to the multilevel codebook index.

It should be noted that the access network entity referred to in this embodiment may be the access network entity according to the embodiments shown in FIGS. 1 to 6, and any implementation of the access network entity according to the embodiments shown in FIGS. 1 to 6 can be achieved by the access network entity of this embodiment with the same beneficial effects, which is thus not described in detail herein.

Figure 11:
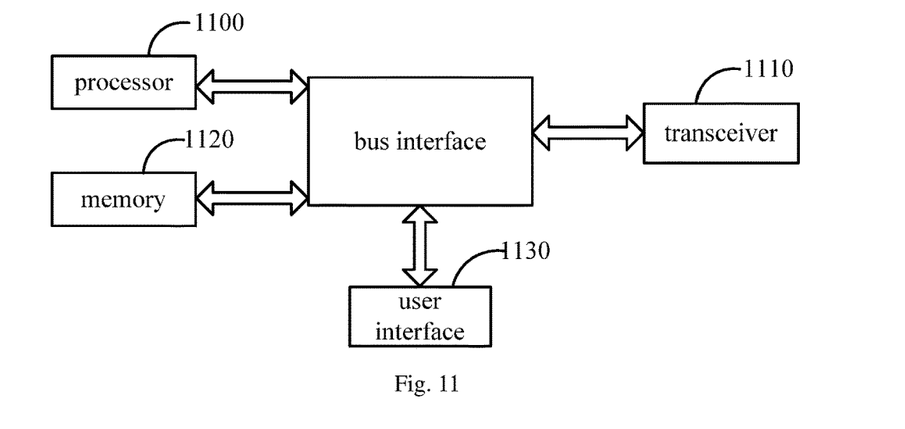
FIG. 11 is a schematic structural diagram of UE according to an embodiment of the present disclosure.

Reference is made to FIG. 11, which shows a schematic structural diagram of UE according to an embodiment of the present disclosure. As shown in FIG. 11, the UE includes a processor 1100, a transceiver 1110, a memory 1120, a user interface 1130 and a bus interface.

The processor 1100 is configured to read programs stored on the memory 1120, to perform the following processes:

receiving a control signaling transmitted by an access network entity;

determining a multilevel codebook index in response to the control signaling; and determining a target precoding matrix based on the multilevel codebook index and a multilevel codebook obtained in advance.

The transceiver 1110 is configured to receive and transmit data under the control of the processor 1100.

The bus architecture in FIG. 11 may include any number of interconnected buses and bridges, which links various circuits such as one or more processors represented by the processor 1100 and the memories presented by the memory 1120. The bus architecture can also link other circuit components such as an external device, a voltage stabilizer and a power management circuit, which is common knowledge in the art and is therefore not described in further detail in the present disclosure. The bus interface provides interfaces. The transceiver 1110 may be multiple components, i.e., include a transmitter and a receiver, which provide units for communication with other devices through a transmission medium. For different user equipment, the user interface 1130 may be an interface for connecting desired internal or external devices which include, but not limited to, a key pad, a display, a loudspeaker, a microphone and a joystick.

The processor 1100 is responsible for management of the bus architecture and general processing, and the memory 1120 may store the data used by the processor 1100 in performing operations.

Optionally, the processor 1100 is further configured to:

receive a multilevel control signaling transmitted by the access network entity, where codebook indexes of different levels are carried in different levels of the multilevel control signaling.

Optionally, the processor 1100 is further configured to:

receive multiple control signalings transmitted by the access network entity, where codebook indexes of different levels are carried in different control signalings.

Optionally, the processor 1100 is further configured to:

receive one or more control signalings transmitted by the access network entity, where a partial-level codebook index in the multilevel codebook index is carried in the one or more control signalings; and determining, by the processor 1100, a multilevel codebook index in response to the control signaling includes:

determine the multilevel codebook index based on the partial-level codebook index and a codebook index of another level or codebook indexes of other levels previously received.

Optionally, the multilevel codebook includes multiple precoding matrices, where a codebook index of each level corresponds to a precoding matrix; and determining, by the processor 1100, a target precoding matrix based on the multilevel codebook index and a multilevel codebook obtained in advance includes:

obtaining, from the multilevel codebook, a precoding matrix corresponding to the codebook index of each level based on the multilevel codebook index, and obtaining the target precoding matrix by performing a predetermined matrix operation on precoding matrices corresponding to codebook indexes of both or all levels Optionally, the multilevel codebook index is a dual-level codebook index, where the dual-level codebook index includes a first-level codebook index and a second-level codebook index; and determining, by the processor 1100, a target precoding matrix based on the multilevel codebook index and a multilevel codebook obtained in advance includes:

obtaining, by the UE, from the multilevel codebook a first-level precoding matrix corresponding to the first-level codebook index based on the first-level codebook index, obtaining, by the UE, from the multilevel codebook a second-level precoding matrix corresponding to the second-level codebook index based on the second-level codebook index, and obtaining, by the UE, the target precoding matrix by performing the predetermined matrix operation on the first-level precoding matrix and the second-level precoding matrix.

Optionally, the first-level codebook index indicates a precoding matrix of a sub-band set, and the second-level codebook index indicates a precoding matrix of a sub-band.

Optionally, the multilevel codebook includes multiple precoding matrices, where each multilevel codebook index corresponds to a precoding matrix; and determining, by the processor 1100, a target precoding matrix based on the multilevel codebook index and a multilevel codebook obtained in advance includes:

obtaining from the multilevel codebook obtained in advance a precoding matrix corresponding to the multilevel codebook index as the target precoding matrix based on the multilevel codebook index.

It should be noted that the UE referred to in this embodiment may be the UE according to the embodiments shown in FIGS. 1 to 6, and any implementation of the UE according to the embodiments shown in FIGS. 1 to 6 can be achieved by the UE of this embodiment with the same beneficial effects, which is thus not described in detail herein.

Figure 12:
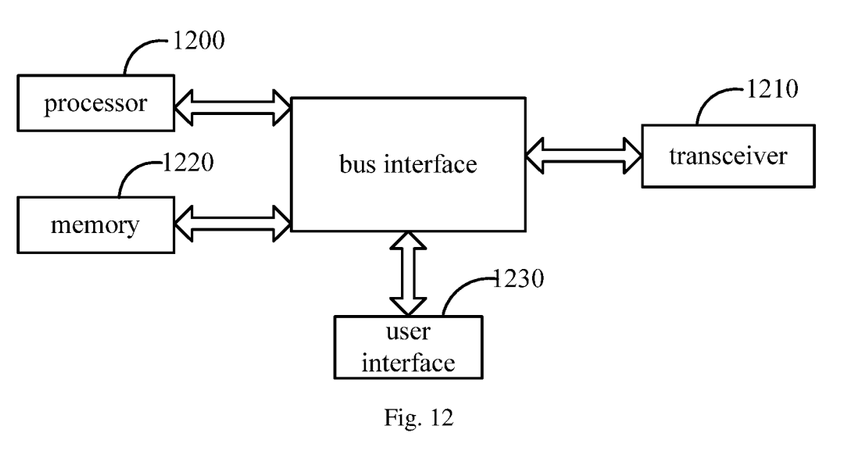
FIG. 12 is a schematic structural diagram of an access network entity according to an embodiment of the present disclosure.

Reference is made to FIG. 12, which shows a schematic structural diagram of an access network entity according to an embodiment of the present disclosure. As shown in FIG. 12, the access network entity includes a processor 1200, a transceiver 1210, a memory 1220, a user interface 1230 and a bus interface.

The processor 1200 is configured to read programs stored on the memory 1220, to perform the following process:

transmitting a control signaling to UE, where the control signaling is used for the UE to determine a multilevel codebook index and the multilevel codebook index is used for the UE to determine a target precoding matrix.

The bus architecture in FIG. 12 may include any number of interconnected buses and bridges, which links various circuits such as one or more processors represented by the processor 1200 and the memories presented by the memory 1220. The bus architecture can also link other circuit components such as an external device, a voltage stabilizer and a power management circuit, which is common knowledge in the art and is therefore not described in further detail in the present disclosure. The bus interface provides interfaces. The transceiver 1210 may be multiple components, i.e., include a transmitter and a receiver, which provide units for communication with other devices through a transmission medium. The processor 1200 is responsible for management of the bus architecture and general processing, and the memory 1220 may store the data used by the processor 1200 in performing operations.

The processor 1200 is responsible for management of the bus architecture and general processing, and the memory 1220 may store the data used by the processor 1200 in performing operations.

Optionally, transmitting, by the access network entity, a control signaling to UE includes: transmitting, by the access network entity, a multilevel control signaling to the UE, where codebook indexes of different levels are carried in different levels of the multilevel control signaling.

Optionally, transmitting, by the access network entity, a control signaling to UE includes: transmitting, by the access network entity, multiple control signalings to the UE, where codebook indexes of different levels are carried in different control signalings.

Optionally, transmitting, by the access network entity, a control signaling to UE includes: transmitting, by the access network entity, one or more control signalings to the UE, where a partial-level codebook index in the multilevel codebook index is carried in the one or more control signalings, and the partial-level codebook index is used to determine the multilevel codebook index with a codebook index of another level or codebook indexes of other levels previously received.

Optionally, the multilevel codebook includes multiple precoding matrices, where a codebook index of each level corresponds to a precoding matrix; and the target precoding matrix is obtained by performing a predetermined operation on precoding matrices corresponding to codebook indexes of both or all levels in the multilevel codebook index.

Optionally, the multilevel codebook includes multiple precoding matrices, where each multilevel codebook index corresponds to a precoding matrix; and the target precoding matrix is a precoding matrix in the multilevel codebook and corresponding to the multilevel codebook index.

It should be noted that the access network entity referred to in this embodiment may be the access network entity according to the embodiments shown in FIGS. 1 to 6, and any implementation of the access network entity according to the embodiments shown in FIGS. 1 to 6 can be achieved by the access network entity of this embodiment with the same beneficial effects, which is thus not described in detail herein.

It should be understood that the method and the device according to the embodiments of the present application may be implemented in other manners. For example, the device embodiments described above are merely illustrative. For example, the division of the units is only a logical function division. In practical implementation, there may be other division manners, for example, multiple units or components may be combined or integrated into another system, or some features can be ignored or not implemented. In addition, the mutual coupling or direct coupling or communication connection shown or discussed may be an indirect coupling or communication connection through some interfaces, devices or units, which may be electrical, mechanical or in another form.

In addition, each functional unit in various embodiments of the present disclosure may be integrated into one processing unit, or each unit may be physically implemented individually, or two or more units may be integrated into one unit. The above integrated unit may be implemented in the form of hardware or in the form of hardware plus software functional units.

The above-described integrated unit implemented in the form of software functional units may be stored in a computer-readable storage medium. The above software functional units are stored in a storage medium and include multiple instructions for enabling a computer device (which may be a personal computer, a server, or a network device, etc.) to perform part of the steps of the transceiving method according to the various embodiments of the present disclosure. The foregoing storage medium includes: a U disk, a mobile hard disk, a read-only memory (Read-Only Memory, abbreviated as ROM), a random access memory (Random Access Memory, abbreviated as RAM), a disk or an optical disk, and the like, which can store program codes.

The above-described are some preferred embodiments of the present disclosure. It should be noted that those skilled in the art can also make numerous improvements and refinements without departing from the principles of the present disclosure, and those improvements and refinements shall also fall within the scope of protection of this disclosure.

What is claimed is:

1. A method for indicating precoding information, comprising:
   receiving, by a user equipment (UE), a control signaling transmitted by an access network entity;
   determining, by the UE, a multilevel codebook index in response to the control signaling; and
   determining, by the UE, a target precoding matrix based on the multilevel codebook index and a multilevel codebook obtained in advance,
   wherein the multilevel codebook comprises a plurality of precoding matrices, and a codebook index of each level corresponds to one of the precoding matrices; and
   the determining, by the UE, the target precoding matrix based on the multilevel codebook index and the multilevel codebook obtained in advance comprises:
      obtaining, by the UE from the multilevel codebook, a precoding matrix corresponding to the codebook index of each level based on the multilevel codebook index, and
      obtaining, by the UE, the target precoding matrix by performing a predetermined matrix operation on precoding matrices corresponding to the codebook indexes of both or all levels; or
   wherein the multilevel codebook comprises a plurality of precoding matrices, and each multilevel codebook index corresponds to one of the precoding matrices; and
   the determining, by the UE, the target precoding matrix based on the multilevel codebook index and the multilevel codebook obtained in advance comprises:
      obtaining, by the UE, from the multilevel codebook obtained in advance, a precoding matrix corresponding to the multilevel codebook index as the target precoding matrix based on the multilevel codebook index.

2. The method according to claim 1, wherein the receiving, by the UE, the control signaling transmitted by the access network entity comprises:
   receiving, by the UE, a multilevel control signaling transmitted by the access network entity, wherein codebook indexes of different levels are carried in different levels of the multilevel control signaling.

3. The method according to claim 1, wherein the receiving, by the UE, the control signaling transmitted by the access network entity comprises:
   receiving, by the UE, a plurality of control signalings transmitted by the access network entity, wherein codebook indexes of different levels are carried in different control signalings.

4. The method according to claim 1, wherein the receiving, by the UE, the control signaling transmitted by the access network entity comprises:
   receiving, by the UE, one or more control signalings transmitted by the access network entity, wherein a codebook index of a part level in the multilevel codebook index is carried in the one or more control signalings; and
   the determining, by the UE, the multilevel codebook index in response to the control signaling comprises:
      determining, by the UE, the multilevel codebook index based on the codebook index of the part level and codebook indexes of levels other than the part level that have been previously received.

5. The method according to claim 1, wherein the multilevel codebook index is a dual-level codebook index, and the dual-level codebook index comprises a first-level codebook index and a second-level codebook index; and
   the determining, by the UE, the target precoding matrix based on the multilevel codebook index and the multilevel codebook obtained in advance comprises:
      obtaining, by the UE from the multilevel codebook, a first-level precoding matrix corresponding to the first-level codebook index based on the first-level codebook index,
      obtaining, by the UE from the multilevel codebook, a second-level precoding matrix corresponding to the second-level codebook index based on the second-level codebook index, and
      obtaining, by the UE, the target precoding matrix by performing the predetermined matrix operation on the first-level precoding matrix and the second-level precoding matrix.

6. The method according to claim 5, wherein the first-level codebook index indicates a precoding matrix of a sub-band set, and the second-level codebook index indicates a precoding matrix of a sub-band.

7. A non-transient computer-readable storage medium, wherein instructions are stored on the non-transient computer-readable storage medium, and the instructions are performed by a processor to implement steps in the method according to claim 1.

8. A method for indicating precoding information, comprising:
   transmitting, by an access network entity, a control signaling to a user equipment (UE), wherein the control signaling is used for the UE to determine a multilevel codebook index, and the multilevel codebook index is used for the UE to determine a target precoding matrix,
   wherein the multilevel codebook comprises a plurality of precoding matrices, and a codebook index of each level corresponds to one of the precoding matrices; and the multilevel codebook index is used for the UE to obtain, from the multilevel codebook, a precoding matrix corresponding to the codebook index of each level based on the multilevel codebook index, and obtain the target precoding matrix by performing a predetermined matrix operation on precoding matrices corresponding to the codebook indexes of both or all levels; or wherein the multilevel codebook comprises a plurality of precoding matrices, and each multilevel codebook index corresponds to one of the precoding matrices; and the multilevel codebook index is used for the UE to obtain, from the multilevel codebook obtained in advance, a precoding matrix corresponding to the multilevel codebook index as the target precoding matrix based on the multilevel codebook index.

9. The method according to claim 8, wherein the transmitting, by the access network entity, the control signaling to UE comprises:
transmitting, by the access network entity, a multilevel control signaling to the UE, wherein codebook indexes of different levels are carried in different levels of the multilevel control signaling.

10. The method according to claim 8, wherein the transmitting, by the access network entity, the control signaling to UE comprises:
transmitting, by the access network entity, a plurality of control signalings to the UE, wherein codebook indexes of different levels are carried in different control signalings.

11. The method according to claim 8, wherein the transmitting, by the access network entity, the control signaling to UE comprises:
transmitting, by the access network entity, one or more control signalings to the UE, wherein a codebook index of a part level in the multilevel codebook index is carried in the one or more control signalings, and the codebook index of the part level is used to determine the multilevel codebook index with codebook indexes of levels other than the part level that have been previously received.

12. A non-transient computer-readable storage medium, wherein instructions are stored on the non-transient computer-readable storage medium, and the instructions are performed by a processor to implement steps in the method according to claim 8.

13. A user equipment (UE), comprising: a transceiver, a processor, and a memory configured to store programs or data used for the processor to perform operations, wherein the processor is configured to: perform steps in the method according to claim 1.

14. The UE according to claim 13, wherein the processor is configured to receive a multilevel control signaling transmitted by the access network entity, wherein codebook indexes of different levels are carried in different levels of the multilevel control signaling; or
wherein the processor is configured to receive a plurality of control signalings transmitted by the access network entity, wherein codebook indexes of different levels are carried in different control signalings; or
wherein the processor is configured to receive one or more control signalings transmitted by the access network entity, wherein a codebook index of a part level in the multilevel codebook index is carried in the one or more control signalings; and the processor is configured to determine the multilevel codebook index based on the codebook index of the part level and codebook indexes of levels other than the part level that have been previously received.

15. The UE according to claim 13, wherein the multilevel codebook index is a dual-level codebook index, and the dual-level codebook index comprises a first-level codebook index and a second-level codebook index; and the processor is configured to:
obtain, from the multilevel codebook, a first-level precoding matrix corresponding to the first-level codebook index based on the first-level codebook index,
obtain, from the multilevel codebook, a second-level precoding matrix corresponding to the second-level codebook index based on the second-level codebook index, and
obtain the target precoding matrix by performing the predetermined matrix operation on the first-level precoding matrix and the second-level precoding matrix.

16. The UE according to claim 15, wherein the first-level codebook index indicates a precoding matrix of a sub-band set, and the second-level codebook index indicates a precoding matrix of a sub-band.

17. An access network entity, comprising:
a transceiver, a processor, and a memory configured to store programs or data used for the processor to perform operations, wherein:
the processor is configured to perform steps in the method according to claim 8.

18. The access network entity according to claim 17, wherein the processor is configured to:
transmit a multilevel control signaling to the UE, wherein codebook indexes of different levels are carried in different levels of the multilevel control signaling; or
transmit a plurality of control signalings to the UE, wherein codebook indexes of different levels are carried in different control signalings; or
transmit one or more control signalings to the UE, wherein a codebook index of a part level in the multilevel codebook index is carried in the one or more control signalings, and the codebook index of the part level is used to determine the multilevel codebook index with codebook indexes of levels other than the part level that have been previously received.

* * * * *